United States Patent
Lunsford et al.

[15] 3,696,104
[45] Oct. 3, 1972

[54] 1-HYDROCARBON-4-ARYL-2,3-DIOXO-5-(2-HALOETHYL) PIPERAZINES

[72] Inventors: Carl Dalton Lunsford, Richmond; Albert Duncan Cale, Jr., Mechanicsville, both of Va.

[73] Assignee: A.H. Robins Company, Incorporated, Richmond, Va.

[22] Filed: April 27, 1970

[21] Appl. No.: 32,364

[52] U.S. Cl. ............... 260/268 DK, 260/247.5 R, 260/268 PH, 260/268 SY, 260/326.85, 424/248, 424/250
[51] Int. Cl. .......................................... C07d 51/70
[58] Field of Search ............. 260/268 PH, 268 DK

[56] References Cited

UNITED STATES PATENTS

| | | |
|---|---|---|
| 3,493,575 | 2/1970 | Tomalia..............260/268 SY |
| 3,149,154 | 9/1954 | Cluff..................260/268 DK |
| 3,471,499 | 10/1969 | Archibald..........260/268 DK |

FOREIGN PATENTS OR APPLICATIONS

| | | |
|---|---|---|
| 1,451,197 | 7/1966 | France...............260/268 DK |

Primary Examiner—Donald G. Daus
Attorney—William King and Norman D. Dawson

[57] ABSTRACT

1-Hydrocarbon-4-aryl-2,3-dioxo-5-(2-haloethyl)piperazines are described. They are prepared by reacting 1-substituted-3-arylaminopyrrolidines with oxalyl halides to form and N-(1-hydrocarbon-3-pyrrolidinyl)-N-aryloxamoyl halide intermediate which is not isolated and which rearranges under thermal and/or basic conditions to the novel compounds of the invention.

9 Claims, No Drawings

1-HYDROCARBON-4-ARYL-2,3-DIOXO-5-(2-HALOETHYL) PIPERAZINES

The present invention relates to novel heterocyclic organic compounds which may be referred to as substituted-2,3-dioxopiperazines and is more particularly concerned with 1,4-disubstituted-2,3-dioxo-5-(2-haloethyl)piperazines.

The invention is especially concerned with novel compounds having the formula:

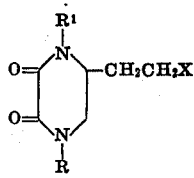

Formula I wherein;

R is selected from the group consisting of lower-alkyl, lower-cycloalkyl and phenyllower-alkyl, $R^1$ is selected from the group consisting of phenyl, lower-alkylphenyl, di-lower-alkylphenyl, lower-alkoxyphenyl, halophenyl, trifluoromethylphenyl, lower-alkyl-halophenyl and 1-naphthyl, and X is selected from the group consisting of bromine and chlorine.

These compounds are useful intermediates in the preparation of 1-substituted-2,3-dioxo-5-(2-aminoethyl)-4-arylpiperazines and 1-substituted-3-(2-aminoethyl)-4-arylpiperazines disclosed in copending application Ser. No. 32,346 filed on even date herewith. The latter compounds are useful as antiviral agents.

The novel compounds of the copending application display significant antiviral activity and may be employed in the therapy of viral infections of the myxovirus group including Parainfluenza, Types I and III, Long Strain of Respiratory Syncytial Virus and Type A Influenza infections. The antiviral activity of the novel compounds has been demonstrated by standard in vitro and in vivo techniques including tissue culture and mouse protection tests.

The antiviral activity of some of the novel compounds of the present invention is shown below in Table I.

TABLE I

| 4 Phenyl Piperazine Compound | Influenza | Type III[1] | RS[2] |
|---|---|---|---|
| 2,3 Di oxo-1-isopropyl-5(2 morpholine ethyl)- | Active | — | — |
| 2,3 di oxo-5(2 dimethyl amino ethyl)- | — | Active | — |
| 1 Cyclo ethyl 3(2 morpholino ethyl)- | Active | — | — |
| 1 Cyclo ethyl 2,3 di oxo 5 (morpholino ethyl)- | — | Active | — |
| 1 Cyclo ethyl 2,3 di oxo 5 (2 dimethyl amino ethyl)- | Active | Active | Active |

[1]Parainfluenza, Type III.
[2]Long Strain of Respiratory Syncytial Virus.

It is, accordingly, an object of the present invention to provide new and useful 1,4-disubstituted-2,3-dioxo-5-(2-halo-ethyl)piperazines. A further object is to provide methods for preparing the new and useful compounds described herein. Other objects of the invention will be apparent to one skilled in the art, and still other objects will become apparent hereinafter.

The term "lower-alkyl" as used herein includes straight and branched chain radicals of up to eight carbon atoms inclusive, and is exemplified by such groups as methyl, ethyl, propyl, isopropyl, butyl, secondary butyl, tertiary butyl, amyl, isoamyl, hexyl, heptyl, octyl, and the like. "Lower-alkoxy" has the formula -O-lower-alkyl.

Among the suitable radicals within the scope of $R^1$ are phenyl radicals either unsubstituted or substituted by any radical or radicals which are not reactive or otherwise interfering under the conditions of reaction such as lower-alkoxy, lower-alkyl, trifluoromethyl, halo, and the like. The substituted phenyl radicals have preferably no more than 1 to 3 substituents such as those given above and, furthermore, these substituents can be in various available positions of the phenyl nucleus and, when more than one substituent is present, can be the same or different and can be in various position combinations relative to each other. The lower-alkyl and lower-alkoxy substituents each have preferably one to four carbon atoms which can be arranged as straight or branched chains.

The term "cycloalkyl" as used herein includes primarily cyclic alkyl radicals containing three up to nine carbon atoms inclusive and encompasses such groups as cyclopropyl, cyclobutyl, cyclohexyl, cyclopentyl, methylcyclohexyl, cycloheptyl, and cyclooctyl.

When halogen is referred to herein, preferably but not necessarily the halogen of atomic weight in excess of 18 but not greater than 80 is employed.

The following Chart I illustrates the process of the invention and shows the procedure involved in preparing the final products of the invention. In Chart I, all the symbols have the values previously assigned.

CHART I

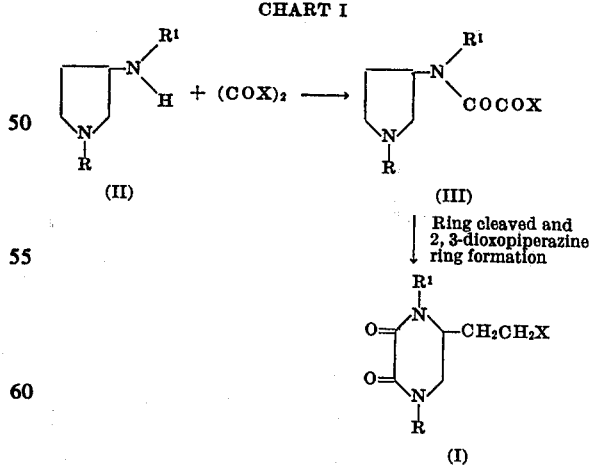

The starting materials for the process of the present invention are the appropriately substituted 3-aminopyrrolidines represented in Chart I by Formula II. These materials (II) are known compounds and are prepared by methods disclosed in U.S. Pat. No. 3,337,580.

A suitable general procedure for carrying out the process of the invention is as follows.

A solution of oxalyl chloride, or other oxalyl halide such as oxalyl bromide, is placed in a suitable reaction vessel, e.g., a three-necked, round-bottomed flask equipped with a stirrer, reflux condenser, thermometer and dropping funnel, employing a solvent which is inert under the reaction conditions. Suitable solvents are chloroform, methylene chloride, and the like. The reaction may be carried out at any suitable temperature and in any suitable manner. A preferred temperature range is about zero to 25° C. About five hundred milliliters of solvent per mole of oxalyl halide provides a suitable medium. The appropriate 1-substituted-3-arylaminopyrrolidine (II) is added dropwise with stirring while maintaining the temperature within the desired range. The pyrrolidine reactant is used in a quantity which preferably is at least equimolar to the oxalyl chloride or other oxalyl halide used. However, it is preferred that an excess of oxalyl chloride, as for example about 1.3 to two molar equivalents, be used in order to improve the yield of the desired product. A tertiary amine, as for example triethylamine, is added at a temperature of from about 0° to about 15° C., preferably at about 10° C. and in a molar amount equal to about twice the molar amount of 1-substituted-3-arylaminopyrrolidine reactant. The temperature may be allowed to rise slowly to room temperature over a suitable period as, for example, about 1 to 2 hours. Although the reaction may be carried out at room temperature when a tertiary base is used, elevated temperatures may be advantageously used in the absence of a base. After a suitable reaction period, the reaction mixture is cooled to a suitable temperature as, for example, about 10° C. to 20° C. and the product is separated and isolated in an appropriate manner. The isolation step usually comprises washing the reaction mixture with aqueous mineral acid, aqueous alkali, drying and concentrating and crystallizing the residue from an appropriate solvent. The resulting product is the 1,4-disubstituted-2,3-dioxo-5-(2-haloethyl)piperazine (I).

The following examples are given by way of illustration only and are not to be construed as limiting.

The examples immediately following illustrate the preparation of 1,4-disubstituted-2,3-dioxo-5-(2-haloethyl)piperazines according to the invention.

EXAMPLE 1

5-(2-Chloroethyl)-2,3-dioxo-1-isopropyl-4-phenylpiperazine.

To a stirred solution of 20.6 g. (0.162 mole) of oxalyl chloride in 200 ml. of chloroform maintained at 5° C. was added 30 g. (0.147 mole) of 3-anilino-1-isopropylpyrrolidine over a period of one-half hour. The solution was stirred at 5° C. for an additional 30 minutes and then 20 g. of triethylamine was added dropwise. The resulting solution was stirred thirty minutes and then extracted successively with dilute sodium hydroxide and dilute hydrochloric acid. The organic solution was dried over sodium sulfate and concentrated. The solid residue was recrystallized from an isopropyl ether-methanol mixture and the colorless crystalline material melted at 171°–173° C. The yield was 23 gms. (51 percent).

Analysis: Calculated for $C_{15}H_{19}ClN_2O_2$: C,61.11; H,6.50; N,9.51 Cl,12.03
Found: C,61.21; H,6.49; N,9.62 Cl,12.31

5-(2-Chloroethyl)-2,3-dioxo-1-isopropyl-4-phenylpiperazine, m.p. 171°–173° C. was prepared by treating a refluxing solution of 25 g. (0.192 mole) of oxalyl chloride in 75 ml. of chloroform with a chloroform solution containing 36 g. (0.177 mole) of 3-anilino-1-isopropylpyrrolidine and refluxing the reaction mixture for a period of 3 hours. The reaction mixture was worked up as described above.

EXAMPLE 1A 5-(2-Bromoethyl)-2,3-dioxo-1-isopropyl-4-phenylpiperazine.

Utilizing the method of Example 1, 3-anilino-1-isopropylpyrrolidine is reacted with a solution of oxalyl bromide in chloroform to give 5-(2-bromoethyl)-2,3-dioxo-1-isopropyl-4-phenylpiperazine.

EXAMPLE 2

5-(2-Chloroethyl)-2,3-dioxo-1-methyl-4-phenylpiperazine.

To a stirred solution of 8.7 g. (0.07 mole) of oxalyl chloride in 75 ml. of chloroform maintained at 5° C. was added dropwise a solution of 10 g. (0.057 mole) of 3-anilino-1-methylpyrrolidine in 75 ml. of chloroform. The solution was stirred an additional 20 minutes and then 10 g. of triethyl amine was added dropwise with the temperature maintained at 10° C. The mixture was stirred one hour while the temperature rose to 25° C. The mixture was washed with 100 ml. of dilute sodium hydroxide, the organic layer dried with sodium sulfate and concentrated at reduced pressure. The solid residue was crystallized from ethyl acetate-ethanol and recrystallized twice from isopropyl ether-methanol. The yield was 2.7 g. (18 percent) and the product melted at 171°–173° C.

Analysis: Calculated for $C_{13}H_{15}ClN_2O_2$: C,58.53; H,5.67; N,10.51
Found: C,58.54; H,5.60; N,10.48

EXAMPLE 3

5-(2-Chloroethyl)-2,3-dioxo-1-ethyl-4-phenylpiperazine.

A solution of 89 g. (0.70 mole) of oxalyl chloride in 200 ml. of a chloroform was added dropwise to a stirred solution of 160 g. (0.53 mole) of 3-anilino-1-ethylpyrrolidine in 200 ml. of chloroform maintained at 5° C. Subsequent to the addition the mixture was stirred for thirty minutes and then treated dropwise with 90 g. (0.89 mole) of triethylamine with the pot temperature kept below 10° C. The stirring reaction mixture was allowed to rise to room temperature over a 1 hour period and was then shaken with dilute sodium hydroxide solution. The organic layer was separated, dried over sodium sulfate and concentrated at reduced pressure. The residue after one crystallization from ethyl acetate-methanol was recrystallized repeatedly from isopropyl ether-methanol until the melting point remained constant at 152°–154° C. The yield of recrystallized product was 31 percent.

EXAMPLE 4

5-(2-Chloroethyl)-1-cyclohexyl-2,3-dioxo-4-phenyl-piperazine.

A stirred solution of 93.5 g. (0.73 mole) of oxalyl chloride and 200 ml. of chloroform was maintained below 10° C. while a solution of 121 g. (0.495 mole) of 3-anilino-1-cyclohexyl-pyrrolidine was added dropwise. Thirty minutes after the addition was completed, 85 g. of triethylamine was added dropwise to the stirred mixture with the pot temperature maintained at 10° C. Following the addition the external cooling bath was removed and the pot temperature allowed to rise to room temperature over two hours. The reaction mixture was then washed with dilute sodium hydroxide solution, the chloroform layer was separated, dried and concentrated at reduced pressure. The residue was crystallized from dimethylformamide-ethanol to give 90 g. (54 percent) of product which melted at 212°–214° C.

Analysis: Calculated for $C_{16}H_{23}N_2O_2Cl$: C,64.56; H,6.92; N,8.36
Found: C,64.27; H,6.82; N,8.61

EXAMPLE 5

When, in the procedure of Example 1, 3-anilino-1-isopropyl-pyrrolidine is replaced by an equal molar amount of:
3-(o-chloroanilino)-1-methylpyrrolidine,
3-(p-chloroanilino)-1-ethylpyrrolidine,
1-ethyl-3-(p-methoxyanilino)pyrrolidine,
1-isopropyl-3-(o-methylanilino)-pyrrolidine,
3-anilino-1-benzylpyrrolidine,
3-anilino-1-phenethylpyrrolidine,
1-ethyl-3-(m-trifluoromethylanilino)pyrrolidine,
3-anilino-1-cyclopentylpyrrolidine,
1-ethyl-3-(p-ethylanilino)pyrrolidine,
3-(o-bromoanilino)-1-methylpyrrolidine,
3-(p-bromoanilino)-1-methylpyrrolidine,
3-(2,4-dimethylanilino)-1-ethylpyrrolidine,
1-isopropyl-3-(2-methyl-3-chloroanilino)pyrrolidine, and
1-ethyl-3-(1-naphthylamino)pyrrolidine, there are obtained,
5-(2-chloroethyl)-4-(o-chlorophenyl)-2,3-dioxo-1-methyl-piperazine,
5-(2-chloroethyl)-4-(p-chlorophenyl)-2,3-dioxo-1-ethyl-piperazine,
5-(2-chloroethyl)-2,3-dioxo-1-ethyl-4-(p-methoxyphenyl) piperazine,
5-(2-chloroethyl)-2,3-dioxo-1-isopropyl-4-(o-methylphenyl) piperazine,
1-benzyl-5-(2-chloroethyl)-2,3-dioxo-4-phenyl-piperazine,
5-(2-chloroethyl)-2,3-dioxo-1-phenethyl-4-phenyl-piperazine,
5-(2-chloroethyl)-2,3-dioxo-1-ethyl-4-(m-trifluoromethylphenyl)piperazine,
5-(2-chloroethyl)-1-cyclopentyl-2,3-dioxo-4-phenyl-piperazine,
5-(2-chloroethyl)-2,3-dioxo-1-ethyl-4-(p-ethylphenyl) piperazine,
4-(o-bromophenyl)-5-(2-chloroethyl)-2,3-dioxo-1-methyl-piperazine,
4-(p-bromophenyl)-5-(2-chloroethyl)-2,3-dioxo-1-methyl-piperazine,
5-(2-chloroethyl)-4-(2,4-dimethylphenyl)-2,3-dioxo-1-ethyl-piperazine,
5-(2-chloroethyl)-2,3-dioxo-1-isopropyl-4-(2-methyl-3-chlorophenyl)piperazine, and
5-(2-chloroethyl)-2,3-dioxo-1-ethyl-4-(1-naphthyl)piperazine.

Various modifications and equivalents will be apparent to one skilled in the art and may be made in the compounds and procedures of the present invention without departing from the spirit or scope thereof, and it is therefore to be understood that the invention is to be limited only by the scope of the appended claims.

What is claimed is:

1. A compound selected from 2,3-dioxopiperazines having the formula:

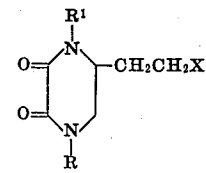

wherein;
R is selected from the group consisting of lower-alkyl, lower-cycloalkyl and phenyllower-alkyl,
$R^1$ is selected from the group consisting of phenyl, lower-alkylphenyl, di-lower-alkylphenyl, lower-alkoxyphenyl, halo-phenyl, trifluoromethylphenyl, lower-alkyl-halophenyl and 1-naphthyl,
X is selected from the group consisting of bromine and chlorine, and
lower-alkyl has one to eight carbon atoms inclusive.

2. A compound of claim 1 which is 5-(2-chloroethyl)-2,3-dioxo-1-isopropyl-4-phenyl-piperazine.

3. A compound of claim 1 which is 5-(2-chloroethyl)-2,3-dioxo-1-ethyl-4-phenylpiperazine.

4. A compound of claim 1 which is 5-(2-chloroethyl-1-cyclohexyl-2,3-dioxo-4-phenylpiperazine.

5. A compound of claim 1 which is 5-(2-chloroethyl)-2,3-dioxo-1-methylpiperazine.

6. A process for the production of a 1,4-disubstituted-2,3-dioxo-5-(2-haloethyl)piperazine which consists of mixing and reacting together a 1-lower-alkyl-3-phenylaminopyrrolidine, a 1-lower-cycloalkyl-3-phenylaminopyrrolidine, or a 1-phenyllower-alkyl-3-phenylaminopyrrolidine with an oxalyl halide to produce the desired 1,4-disubstituted-2,3-dioxo-5-(2-haloethyl)piperazine wherein the substituent in the 1-position corresponds to that in the N-position of the starting pyrrolidine compound and the substituent in the 4-position corresponds to the phenyl substituent in the 3-position of the starting pyrrolidine compound, and the halogen in the 2-position of the 5-ethyl group corresponds to the halogen of the oxalyl halide employed, and lower-alkyl has one to eight carbon atoms inclusive.

7. A process for the preparation of a 2,3-dioxopiperazine of the formula:

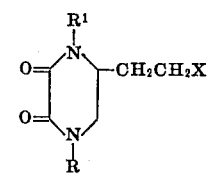

wherein;

R is selected from the group consisting of lower-alkyl, lower-cycloalkyl and phenyllower-alkyl, R¹ is selected from the group consisting of phenyl, lower-alkylphenyl, di-lower-alkylphenyl, lower-alkoxyphenyl, halo-phenyl, trifluoromethylphenyl, lower-alkyl-halophenyl and 1-naphthyl, X is selected from the group consisting of bromine and chlorine, and lower-alkyl has one to eight carbon atoms inclusive.

which consists of mixing and reacting together a 1-lower-alkyl-3-phenyl-aminopyrrolidine, a 1-lower-cycloalkyl-3-phenylaminopyrrolidine or a 1-phenyllower-alkyl-3-phenylaminopyrrolidine of the formula:

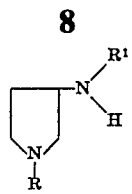

wherein the symbols have the values given, and an oxalyl halide to cause formation of the desired 1,4-disubstituted-2,3-dioxo-5-(2-haloethyl)piperazine wherein the halogen corresponds to the halogen present in the oxalyl halide employed.

8. The process according to claim 7, wherein the reactants are heated to accelerate the reaction.

9. The process according to Claim 7, wherein the oxalyl halide is oxalyl chloride.

* * * * *